(12) United States Patent
Dergounov et al.

(10) Patent No.: US 7,489,256 B2
(45) Date of Patent: Feb. 10, 2009

(54) PARALLEL PARKING ASSISTING VEHICLE INDICATOR

(76) Inventors: Evgeniy Dergounov, 294 Wingham St., Staten Island, NY (US) 10305; Oksana Dergunova, 294 Wingham St., Staten Island, NY (US) 10305

( * ) Notice: Subject to any disclaimer, the term of this patent is extended or adjusted under 35 U.S.C. 154(b) by 334 days.

(21) Appl. No.: 11/518,720

(22) Filed: Sep. 11, 2006

(65) Prior Publication Data

US 2008/0068219 A1    Mar. 20, 2008

(51) Int. Cl.
*G08G 1/14* (2006.01)
(52) U.S. Cl. ............... 340/932.2; 340/468; 340/815.45
(58) Field of Classification Search .............. 340/932.2, 340/468, 815.45
See application file for complete search history.

(56) References Cited

U.S. PATENT DOCUMENTS

2004/0249564 A1* 12/2004 Iwakiri et al. ............... 701/200
2006/0190147 A1*  8/2006 Lee et al. ..................... 701/26

* cited by examiner

*Primary Examiner*—Jeff Hofsass
*Assistant Examiner*—Ojiako Nwugo
(74) *Attorney, Agent, or Firm*—Anna Vishev

(57) ABSTRACT

A vehicle parking indicator including an elongated marker having a longitudinal dimension and a top edge. The marker is mounted on an outer body of a motor vehicle and is visible from outside of the motor vehicle. The elongated marker is configured such that when an axis of the motor vehicle is positioned at a 45° angle to a curb, a sight-line between a side-view mirror of the motor vehicle and the curb is tangential to the top edge of the elongated marker.

6 Claims, 2 Drawing Sheets

PARALLEL PARKING ASSISTING VEHICLE INDICATOR

FIELD OF THE INVENTION

The present invention relates to an indicator affixed to a vehicle and assisting a vehicle operator to correctly parallel park a vehicle.

BACKGROUND OF THE INVENTION

Parallel parking is a method of parking a vehicle in line with other parked cars. Cars parked in parallel are in one line, parallel to the curb, with the front bumper of each car facing the back bumper of an adjacent one. Since parallel parking is parallel to the curb of a road, roads that facilitate said parking have an extra lane or a large shoulder for parked cars. It is also employed anytime perpendicular parking facilities are not available or hard to come by commonly, that's in large metropolitan areas where there is a high density of vehicles and few (or restricted) accommodations such as parking garages.

Parallel parking is considered by many to be one of the hardest skills for new drivers to learn. Following are the typical steps for performing a parallel parking:

- Signal into the space.
- Ensure that the desired parking space is about 2 meters longer than the vehicle's length.
- Line up the vehicle beside the vehicle in front of the parking space.
- Turn the steering wheel one turn towards the curb and put the vehicle into reverse.
- Back up the vehicle so that the rear bumper is first to enter the parking space.
- Once the vehicle is at 45° to the parking spot, slow down and turn the steering wheel all the way, to the road side.
- Continue backing up until the vehicle is parallel with the curb.
- Gradually turn the steering wheel towards the curb to curve the vehicle into a straight position.
- Brake once the vehicle occupies the middle of the parking space.
- Make sure that the vehicle is not parked too far from the curb.

Recognizing the problem of performing an accurate parallel parking some car manufacturers are trying to automate the parking process. For example, one car manufacturer recently disclosed its automated parking system. This system relies on a built-in computer, steering sensor and a tiny camera in the car's rear and works like this:

A dashboard display shows the image taken by the camera. When you near a parking space and shift into reverse, computerized lines pop up on the display, along with arrows pointing up, down, left and right. Using the arrows, you move the lines around until they define exactly where you want the car to be parked. Then you push the "set" button on the display. Keep your foot lightly on the brake pedal, and the car will start backing up, the steering wheel responding to an invisible hand. Voila, the car will park itself in the spot you've chosen with the arrows.

While easy to use, the above automated system is expensive and difficult to implement during the manufacturing process.

Other solutions include the one described in U.S. Pat. No. 6,163,253 entitled "Method and Apparatus for Guided Parking of a Vehicle Using Ultrasonic Position Detection." The '253 Patent discloses a system having a sensing and indicating device mounted at a fixed location and using transmitted and reflected acoustic or electrical energy to determine the distance between the sensor and an approaching vehicle. The sensor provides visual and/or audible indication of the distance between the vehicle and the sensor. The driver of the vehicle uses that displayed or audible information to locate the vehicle within a defined space or envelope, e.g., within a garage. The sensor and indicator may also be located laterally with respect to the vehicle so that the distance between the vehicle side and the sensor can be determined whereby the vehicle can be located laterally within the defined space or envelope.

Similarly to the system described above, the system of the '253 Patent is expensive is difficult to implement.

Accordingly, there is a need in the art for a structure providing a more convenient and safe way to correctly and accurately perform parallel parking.

SUMMARY OF THE INVENTION

In one of its aspects, the present invention provides a vehicle parking indicator including an elongated marker having a longitudinal dimension and a top edge. The marker is mounted on an outer body of a motor vehicle and is visible from outside of the motor vehicle. The elongated marker is configured such that when an axis of the motor vehicle is positioned at a 45° angle to a curb, a sight-line between a side-view mirror of the motor vehicle and the curb is tangential to the top edge of the elongated marker.

In another aspect, the vehicle parking indicator is a portion of a splash guard installed on the motor vehicle.

In a further aspect, the vehicle parking indicator is an LED light mounted on a rear side door of the motor vehicle.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
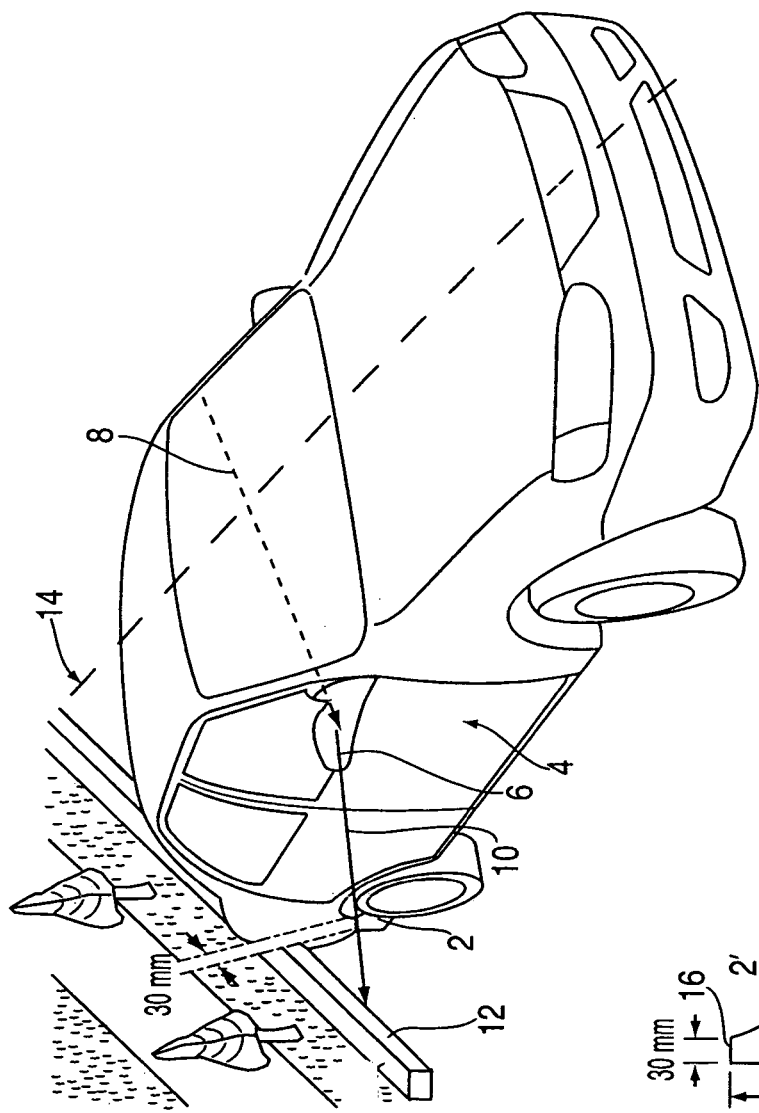
FIG. 1 shows a front perspective view of the motor vehicle with the vehicle parking indicator installed in accordance with the preferred embodiment of the invention.
Figure 2:
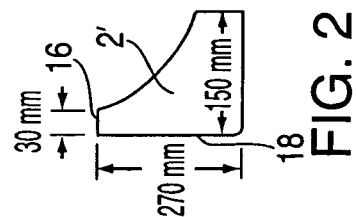
FIG. 2 shows a front schematic view of the splash guard used as the vehicle parking indicator.
Figure 3:
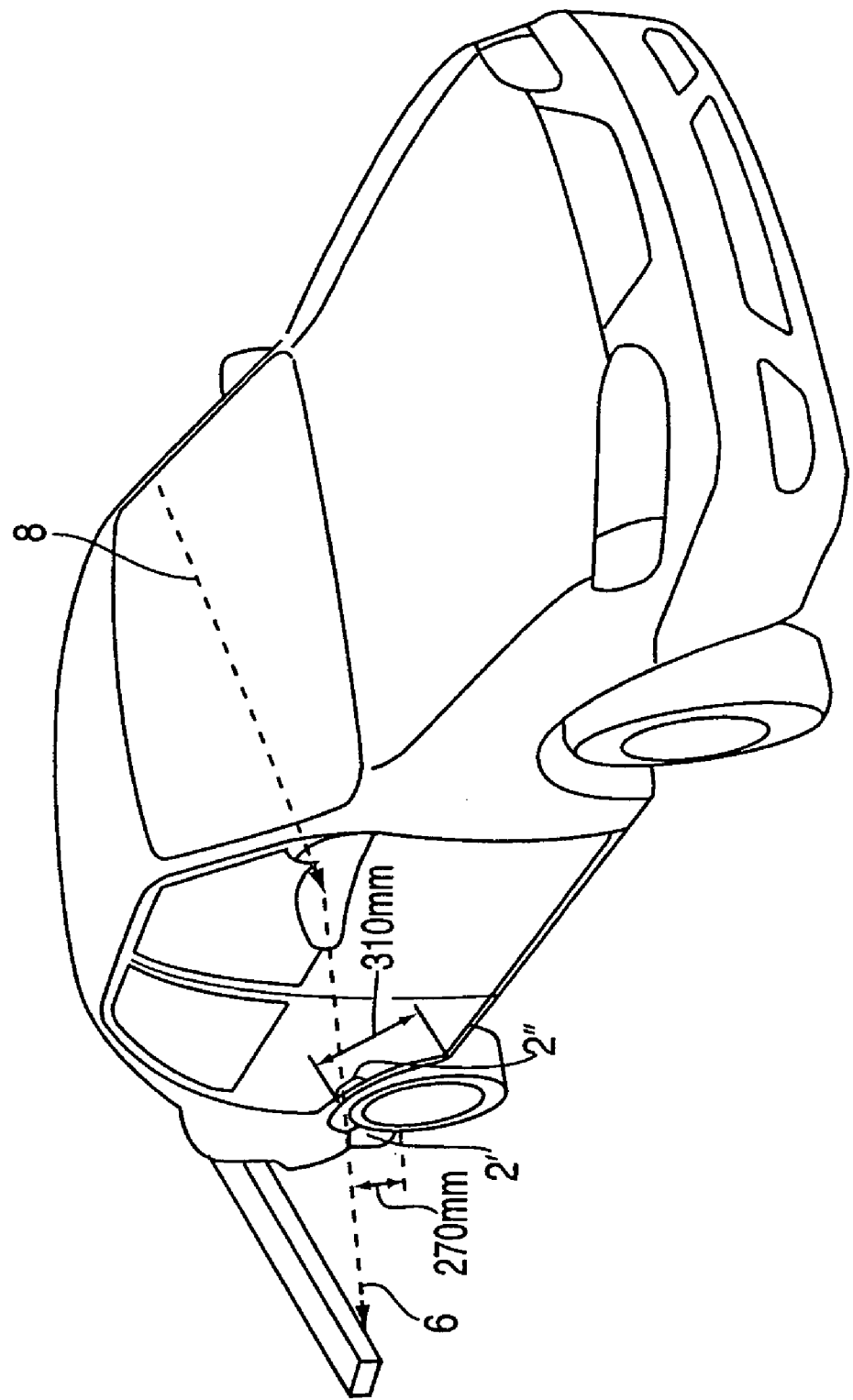
FIG. 3 shows a side perspective view of the motor vehicle having a splash guard used as a first vehicle parking indicator and an LED light, used as a second vehicle parking indicator.

As shown in FIG. 1, in accordance with the present invention a parking indicator 2 is installed on an automobile 4. In the embodiment shown in FIG. 1, parking indicator 2 is a splash guard installed on the automobile 4 in accordance with the method described below. An example of the appropriate splash guard is shown in FIG. 2, where the indicator is labeled as 2'. As shown in FIG. 3, parking indicator 2 may also be a light indicator 2" or any other trim or car accessory installed in accordance with the method described below.

In accordance with the preferred embodiment of the present invention, parking indicator 2 is installed on the motor vehicle when the motor vehicle is positioned at a 45° angle to a curb 12 of a side walk. As shown in FIG. 1, the 45° angle is measured between an axis 14 of automobile 4 and the line of the curb 12. When automobile is positioned at the described 45° angle, a driver draws an imaginary sight-line 8 from his eyes to a side-view mirror 6 and a further sight-line 10 from the side-view mirror 6 to the curb 12. The parking indicator 2 may be positioned anywhere along the imaginary sight-line 10, such that the sight-line 10 is tangential to the top portion of the parking indicator, while the rest of the parking indicator is placed substantially below the sight-line 10.

A particular example of two parking indicators installed on an automobile is shown in FIG. 3. As described above, first parking indicator 2' is the splash guard, more particularly shown in FIG. 2, installed such that the sight-line 10 is tangential to the top edge 16 of the splash guard's portion 18 visible from the outside of the automobile. For the particular embodiment shown in FIG. 3, the preferred length of the visible portion 18 of the parking indicator 2' is 270 mm, and its preferred width is 30 mm. Second parking indicator 2" is an LED light indicator mounted at the bottom of a side door of the automobile such that the sight-line 10 is tangential to the top edge of the LED light indicator. For the particular embodiment shown in FIG. 3, the preferred distance from the bottom of the door to the top of the LED light indicator is 310 mm. A person skilled in the art will understand that the above used dimensions are specific to the vehicle used and will be different for a different vehicle.

It should be understood that the parking indicator of the present invention is not limited to the above described embodiments. Any appropriately installed marker or device may be used for purposes of serving as the parking indicator. For example, a reflective door guard or a door edge protector installed such that the imaginary sight-line 6 is tangential to the top edge of the guard/protector may also be used as the parking indicator.

Further, an electrical parking indicator may be provided. The electrical parking indicator preferably includes a light (similar to the LED light shown in FIG. 3) and an electrical circuitry configured to switch the light on when the vehicle is put in reverse or, alternatively, when the right turn light is switched on. Electrical circuitry accomplishing the above function is well known in the art. Therefore, its description is omitted here. The light of the parking indicator should then be installed onto the rear right door or the rear portion of the vehicle such that the sight-line 6 is tangential to the light.

In use, a driver will signal into the parking space and line up his/her vehicle beside the vehicle in front of the parking space. The driver will then turn the steering wheel one turn towards the curb and put his/her car into reverse. Next, the driver will back up the vehicle into the parking space until the top edge of the parking indicator is seen in the side-view mirror as being immediately adjacent to the curb. This will ensure that the vehicle is positioned at the desired 45° angle to the curb of the parking spot. When the driver will see in the side-view mirror that the parking indicator is positioned adjacent the curb, he/she will slow down and turn the steering wheel two turns to the road side and continue backing up until the vehicle is parallel with the curb. The driver will then straighten the wheels and will adjust the vehicle's position within the parking spot.

As described above, the parking indicator provided in accordance with the present invention eliminates the necessity to guess the vehicle's angle with respect to the curb and assist the driver in properly positioning the car at the desired 45° angle without estimating or measuring this angle.

For the convenience of the reader, the above description has focused on a representative sample of all possible embodiments, a sample that teaches the principles of the invention and conveys the best mode contemplated for carrying it out. The description has not attempted to exhaustively enumerate all possible variations. For example, although the parking indicator is shown in the figures as being installed on a car, it should be understood that the parking indicator may also be installed on a truck or a bus in the manner described above. Other undescribed variations or modifications may also be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

We claim:

1. A vehicle parking indicator comprising:
    an elongated marker having a longitudinal dimension and a top edge, said marker being mounted on an outer body of a motor vehicle,
    wherein said elongated marker is visible from outside of the motor vehicle, wherein said elongated marker is configured such that when an axis of the motor vehicle is positioned at a 45° angle to a curb, a sight-line between a side-view mirror of the motor vehicle and the curb is tangential to the top edge of the elongated marker.

2. The vehicle parking indicator according to claim 1, wherein said elongated marker is a portion of a splash guard.

3. The vehicle parking indicator according to claim 2, wherein the longitudinal dimension of the elongated marker is 270 mm.

4. The vehicle parking indicator according to claim 1, wherein said elongated marker is an LED light.

5. The vehicle parking indicator according to claim 4, wherein the LED light is mounted on a back side door of the motor vehicle.

6. The vehicle parking indicator according to claim 5, wherein the distance between a bottom of the back side door of the motor vehicle and the top edge of the LED light is 310 mm.

* * * * *